(12) United States Patent
Asandei

(10) Patent No.: US 9,193,810 B2
(45) Date of Patent: Nov. 24, 2015

(54) FREE RADICAL AND CONTROLLED RADICAL POLYMERIZATION PROCESSES USING HYPERVALENT IODIDE RADICAL INITIATORS

(71) Applicant: UNIVERSITY OF CONNECTICUT, Farmington, CT (US)

(72) Inventor: Alexandru D. Asandei, Vernon, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 149 days.

(21) Appl. No.: 13/774,436

(22) Filed: Feb. 22, 2013

(65) Prior Publication Data
US 2013/0225775 A1 Aug. 29, 2013

Related U.S. Application Data

(60) Provisional application No. 61/602,417, filed on Feb. 23, 2012, provisional application No. 61/602,409, filed on Feb. 23, 2012.

(51) Int. Cl.
*C08F 14/22* (2006.01)
*C08F 14/18* (2006.01)
*C08F 2/06* (2006.01)

(52) U.S. Cl.
CPC .............. *C08F 14/22* (2013.01); *C08F 14/18* (2013.01); *C08F 2/06* (2013.01)

(58) Field of Classification Search
CPC ................................................ C08F 14/22
See application file for complete search history.

(56) References Cited

U.S. PATENT DOCUMENTS

2012/0136131 A1\* 5/2012 Goto et al. ................. 527/314

FOREIGN PATENT DOCUMENTS

JP 2008105962 A \* 5/2008
WO WO 2010140372 A1 \* 12/2010

OTHER PUBLICATIONS

Schaefer et al., "A Versatile and Highly Reactive Polyfluorinated Hypervalent Iodine (III) Compound", Angewandte Chemie, International Edition, 2010, 49(15), 2786-2789.\*
Zhdankin, et al., "Chemistry of Polyvalent Iodine", Chem., Rev. (2008), 108, pp. 5299-5358.

\* cited by examiner

*Primary Examiner* — Nicole M Buie-Hatcher
(74) *Attorney, Agent, or Firm* — Ohlandt, Greeley, Ruggiero & Perle, L.L.P.

(57) ABSTRACT

A process is described comprising polymerizing at least one unsaturated monomer (e.g., fluorine substituted alkene monomer) in the presence of a hypervalent iodide radical initiator and a solvent, under reaction conditions and for a time sufficient to polymerize the at least one unsaturated monomer to form a polymer. The present disclosure provides a method for living polymerization of unsaturated monomers (e.g., fluorine substituted alkene monomers), which provides a high level of macromolecular control over the polymerization process and which leads to uniform and controllable polymeric products. The present disclosure also provides a method of functionalization of organic substrates with a $CF_3$ or perfluoro ($R_F$) group.

17 Claims, 6 Drawing Sheets

Fig. 6

| Exp # | RI | Ratio [VDF]/[(CF$_3$COO)$_2$IPh]/[RI] | Time (Hrs) | Conv. % | kp$^{app}$ (h$^{-1}$) | Mn | PDI |
|---|---|---|---|---|---|---|---|
| 1 | - | 50/1/0$^{a)}$ | 42 | 47 | 0.015 | 5,515 | 2.31 |
| 2 | - | 50/1/0 | 42 | 58 | 0.021 | 2,630 | 3.45 |
| 5 | CHI$_3$ | 50/1/0.2 | 50 | 56 | 0.016 | 2,087 | 1.80 |
| 6 | CHI$_3$ | 50/1/0.1 | 14 | 38 | 0.034 | 3,266 | 1.84 |
| 7 | CHI$_3$ | 100/1/0.2 | 48 | 50 | 0.014 | 4,075 | 1.82 |
| 8 | I$_2$ | 50/1/0.5 | 41 | 35 | 0.011 | 1,075 | 1.63 |
| 9 | I$_2$ | 50/1/0.25 | 65 | 46 | 0.009 | 3,734 | 2.54 |
| 10 | I$_2$ | 50/1/0.25 | 50 | 65 | 0.021 | 2,571 | 1.72 |
| 11 | I$_2$ | 50/1/0.15 | 7 | 24 | 0.039 | 2,452 | 1.92 |
| 12 | I$_2$ | 100/1/0.25 | 48 | 50 | 0.014 | 4,908 | 1.69 |
| 13 | Bu$_3$SnI | 50/1/0.25 | 8 | 18 | 0.026 | 5,191 | 2.33 |
| 14 | Bu$_3$SnI | 50/1/0.5 | 24 | 24 | 0.011 | 3,130 | 2.25 |
| 15 | Bu$_3$SnI | 50/1/1 | 70 | 24 | 0.004 | 850 | 2.68 |
| 16 | Bu$_3$SnI | 50/1/0.1 | 3 | 15 | 0.054 | 5,634 | 2.31 |
| 17 | Bu$_3$SnI | 50/1/2 | 44 | 20 | 0.005 | 1,345 | 2.84 |
| 18 | CI$_4$ | 50/1/0.025 | 20 | 41 | 0.026 | 1,799 | 2.90 |
| 19 | Me$_2$SnI$_2$ | 50/1/0.1 | 19 | 30 | 0.019 | 2,519 | 2.69 |
| 20 | Me$_2$SnI$_2$ | 50/1/0.25 | 72 | 13 | 0.002 | 644 | 2.22 |
| 21 | Me$_2$SnI$_2$ | 50/1/0.5 | 74 | 6 | 0.001 | 203 | 1.38 |
| 22 | NIS | 50/1/0.2 | 16 | 40 | 0.032 | 2,512 | 1.98 |
| 23 | I-(CF$_2$)$_6$-I | 50/1/0.25 | 4 | 28 | 0.088 | 0.088 | 0.088 |
| 24 | I-(CF$_2$)$_6$-I | 200/1/0.25 | 6 | 30 | 0.058 | 0.058 | 0.058 |
| 25 | I-(CF$_2$)$_6$-I | 500/1/0.25 | 24 | 25 | 0.015 | 0.015 | 0.015 |
| 26 | I-(CF$_2$)$_6$-I | 200/1/1 | 7 | 32 | 0.050 | 0.050 | 0.050 |
| 27 | I-(CF$_2$)$_6$-I | 500/1/1 | 10 | 27 | 0.035 | 0.035 | 0.035 |
| 28 | I-(CF$_2$)$_6$-I | 1,000/1/1 | 28 | 35 | 0.013 | 0.013 | 0.013 |

FREE RADICAL AND CONTROLLED RADICAL POLYMERIZATION PROCESSES USING HYPERVALENT IODIDE RADICAL INITIATORS

RELATED APPLICATIONS

This application claims priority to U.S. Provisional Patent Application Nos. 61/602,417 and 61/602,409, both filed on Feb. 23, 2012, both of which are incorporated herein in their entirety by reference thereto.

BACKGROUND

1. Field of the Disclosure

This disclosure relates to a process for free radical and for living or controlled polymerization of alkene monomers (e.g., fluorine substituted alkene monomers), particularly the use of hypervalent iodide (HVI) radical initiators in the living or controlled polymerization of alkene monomers and for the functionalization of (organic) substrates with the $CF_3$ or RF groups.

2. Discussion of the Background Art

Conventional chain polymerization of vinyl monomers usually consists of three main elemental reaction steps: initiation, propagation, and termination. Initiation stage involves creation of an active center from an initiator. Propagation involves growth of the polymer chain by sequential addition of monomer to the active center. Termination (including irreversible chain transfer) refers to termination of the growth of the polymer chain. Owing to the presence of termination and poorly controlled transfer reactions, conventional chain polymerization typically yields a poorly controlled polymer in terms of molecular weight and polydispersity which control the polymer properties. Moreover, conventional chain polymerization processes mostly result in polymers with simple architectures such as linear homopolymer and linear random copolymer.

Living polymerization is characterized by the absence of any kinds of termination or side reactions which might break propagation reactions. The most important feature of living polymerization is that one may control the polymerization process to design the molecular structural parameters of the polymer. Additional polymerization systems where the termination reactions are, while still present, negligible compared to propagation reaction are known in the art. As structural control can generally still be well achieved with such processes, they are thus often termed "living" or controlled polymerization.

In living or controlled polymerization, as only initiation and propagation mainly contribute to the formation of polymer, molecular weight can be predetermined by means of the ratio of consumed monomer to the concentration of the initiator used and will increase linearly with conversion. The ratio of weight average molecular weight to number average molecular weight, i.e., molecular weight distribution (Mw/Mn), may accordingly be as low as 1.0, and the polymers have well defined chain ends. Moreover, polymers with specifically desired structures and architectures can be purposely produced. In terms of topology, such structures and architectures may include linear, star, comb, hyperbranched, dendritic, cyclic, network, and the like. In terms of sequence/composition distribution, such structures and architectures may include homopolymer, random copolymer, block copolymer, graft copolymer, gradient copolymer, tapered copolymer, periodic copolymer, alternating copolymer, and the like. In terms of functionalization, such structures and architectures may include telechlics, macromonomer, labeled polymer, and the like.

Living polymerization processes have been successfully used to produce numerous polymeric materials which have been found to be useful in many applications. However, many living polymerization processes have not found wide acceptance in industrial commercialization, mainly due to high cost to industrially implement these processes. Thus, searching for practical living polymerization processes is a challenge in the field of polymer chemistry and materials.

Additionally, as (co)polymers of main chain fluorinated monomers (e.g., vinylidene fluoride (VDF), hexafluoropropene, tetrafluoroethylene, trifluorochloroethylene, and the like) are industrially significant, the study of their controlled radical polymerization and the synthesis of complex polymer architectures thereby derived, would be desirable. However, such polymerizations are challenging on laboratory scale, as $bp_{VDF}=-83°$ C. Thus, telo/polymerizations are carried out at T>80-150° C. and require high-pressure metal reactors.

Kinetic studies of VDF polymerizations involve many one-data-point experiments as direct sampling is difficult. This is very time-consuming and expensive due to the typical lab unavailability of a large number of costly metal reactors, which moreover require tens of grams of monomer. The development of methods that would allow small scale (e.g., a few grams) VDF polymerizations at ambient temperature in inexpensive, low pressure glass tubes, would be highly desirable, since the methods could easily be adapted for fast screening of a wide range of polymerization and of reaction conditions, and could also take advantage of photochemistry. The development of such methods would also be useful on a large scale, for example, in an industrial setting. Conventional initiating systems such as peroxides or redox systems do not initiate the polymerization of VDF at ambient or room temperature.

Driven by the unique properties imparted by the $-CF_3$ moiety onto chemical structures ranging anywhere from synthetic drugs to polymers and nanostructures, trifluoromethylation (TFM) has recently emerged as a very valuable technique towards improving and expanding molecular properties and functions.

As such, while the vast majority of TFM reactions involve nucleophilic ("$CF_3^-$" e.g., $Me_3Si-CF_3$), electrophilic ("$CF_3^+$" e.g. chalcogen salts $[CF_3-YAr_2]OTf$, Y=O, S, Se, Te, or cyclic iodanes such as 1-trifluoromethyl-1,2-benziodoxole, $CF_3-I(-Ph-OCO-)$) as well as organometallic (e.g., "$CF_3-Cu$", or Pd, Ni) protocols for arene or carbonyl TFM functionalization, very recently, radical ($CF_3$.) aryl ($CF_3SO_2Na/^tBuOOH$), enantioselective carbonyl ($CF_3I/RuCl_2(PPH_3)_3$) as well as photomediated aryl ($Ru(phen)_3Cl_2/CF_3SO_2Cl$) and carbonyl ($CF_3-I$) α-TFMs have emerged as a much more/very convenient/inexpensive/very powerful strategies for the rapid synthesis of TFM-lated libraries with wide structural diversity.

Conversely, fluorinated (co)polymers derived from radical reactions are a fundamental class of specialty materials endowed with a wide range of high-end applications which require their precise synthesis. However, while modern state-of-the-art controlled radical polymerizations (CRP) methods (atom transfer, nitroxide or reversible addition-fragmentation) have undergone remarkable developments for conventional monomers such as (meth)acrylates or styrene, they remain ineffective for the highly reactive, gaseous main chain fluorinated alkene monomers (FMs: vinylidene fluoride (VDF), hexafluoropropene (HFP), tetrafluoroethylene, etc).

Thus, due to the current lack of suitable CRP chemistry, the synthesis, characterization and fundamental understanding of the self-assembly, properties and applications of well-defined FM complex macromolecular architectures (blocks, graft, hyperbranched, stars, etc.) still lag significantly behind those associated with the corresponding materials derived from conventional alkenes (styrene, acrylates, dienes, etc.).

To date, industrial FM-CRP is still accomplished with the oldest of CRP methods, the iodine degenerative transfer (IDT: $P_n·+P_m—I \rightleftharpoons P_n—I+P_m·$), which evolved from high temperature (100-250° C.) free radical VDF telomerizations with polyhalides, and especially (per)fluorinated iodine ($R_F—I$) chain transfer (CT) agents, including $CF_3—I$ or $I—(CF_2)_n—I$.

However, while the $R_F—I$ derived electrophilic $R_F·$ radicals add readily to nonfluorinated alkenes at room temperature (rt) under metal catalysis, and many metal complexes activate typical alkyl halide (R-X) ATRP initiators, only very low VDF oligomers are obtained, even at T>100° C. from transition metal salts and polyhalides. Moreover, although VDF polymerization can proceed at room temperature (rt), the metal mediated radical initiation of such electrophilic FMs directly from halides and thus metal-mediated FM-CRP at T<100° C., including around rt, is not available. Consequently, conventional FM-IDT always demands a free radical initiator (e.g. $^t$butyl peroxide).

As such, the development of FM-CRP, the synthesis of elaborate FM polymer architectures, and the mapping the resulting fluoromaterials genome remains a worthy endeavor. Conversely, such polymerizations are very challenging especially in an academic laboratory scale/setting, as all FMs are gases ($b_p^{VDF}=-83°$ C.) and typical telo/polymerizations are carried out at T>100-200° C., in expensive, high-pressure metal reactors.

Moreover, in additional contrast with acrylates- or styrene-CRP, VDF-IDT generates two halide chain ends, $P_n—CH_2—CF_2—I$ and $P_m—CF_2—CH_2—I$ with vastly different reactivity, and, while acrylate or styrene kinetics can effortlessly be sampled even on a 1 g scale, FM polymerizations involve many time-consuming one-data-point reactions using at least tens of grams of monomer.

Thus, development of mild temperature protocols for low pressure, small-scale polymerizations in inexpensive glass tubes, would be very appropriate for fast catalyst and reaction condition screening and also amenable to photochemistry. As such, while VDF high power UV telomerizations exist, until recently, there were no reports on VDF polymerizations under regular visible light.

While $CH_3·$ is also available from, for example, the decomposition of TBPO, the generation of $CF_3·$ from $CF_3—I$ is expensive and impractical ($b_p^{CF3I}=-22.5°$ C.). In fact, except for $Mn_2(CO)_{10}$ experiments above, very few other $CF_3·$ precursors have ever been evaluated in the initiation of FMs, where such radicals were generated either by high temperature thermolysis or under strong UV irradiation from commercially available but inconvenient and expensive $CF_3—Br$ and $CF_3—I$, or from commercially unavailable $CF_3—SO_2—SR$, $CF_3—S—(C=S)—OR$, explosive $CF_3—C(O)O—O(O)C—CF_3$, toxic $Hg(CF_3)_2$, $Cd(CF_3)_2$, $Te(CF_3)_2$, or from even more exotic and expensive substrates such as $CF_3$-decorated octafluoro[2.2]paracyclophane or persistent perfluoro-3-ethyl-2,4-dimethyl-3-pentyl radicals. Thus, availability of a clean, safe, nongaseous, commercially available and inexpensive source of $CF_3·$ radicals would be highly desirable for TFM radical reactions involving either polymerizations or arene functionalization.

Interestingly, although known for over a century, hypervalent iodine$^{(III,V)}$ (HVI) derivatives ($\lambda^3$- and $\lambda^5$-iodanes) have recently undergone a resurgence in organic chemistry. Consequently, they have also become inexpensively commercially available, as illustrated especially by acyloxyiodobenzenes such as $(CX_3COO)_2I^{III}Ph$, (X=H, I-DAB, X=F, I—FDAB) and $(CH_3COO)_3I^V$(-Ph-CO—O—) (Dess-Martin cyclic periodinane, DMP,), or to a lesser extent, by diaryliodonium salts ($Ar_2I^+Y^-$, $Y=PF_6$, OTf, etc.

While the overwhelming majority of such HVI carboxylates applications are oxidations, examples of radical processes are also emerging. Thus, alkyl radicals obtained thermally or under Hg—UV from the decarboxylation of HVIs derived in-situ by ligand exchange of IDAB and IFAB with carboxylic acids, add to alkenes or alkylate heteroaromatic bases. Alternatively, in the additional presence of $I_2$, HVIs mediate the hypoiodite reaction of R—Y—H such as alcohols, carboxylic acids, and amines to generate transient R—Y—I, which upon UV-VIS irradiation provide the corresponding R—Y·radicals (Y=O, COO, NR).

However, while diaryliodonium salts are known cationic polymerizations photoinitiators and photoacid generators in photolithography, the potential use IDAB and IFAB as radical polymerization initiators, remains largely ignored and, to the best of our knowledge, there are no reports on the use of IDAB and IFAB as initiators for the radical polymerization of fluorinated monomers, on the use of IFAB in trifluoromethylation reactions, and on the photolysis of DMPI and its radical reactions.

It would be desirable to provide a method for living polymerization of alkene and fluoroalkene monomers which provides a high level of macromolecular control over the polymerization process and which leads to uniform and more controllable polymeric products. It would be especially desirable to provide such a living polymerization process with existing facility, and which enables the use of a wide variety of readily available starting materials. It would be further desirable to provide a method that would allow small scale (e.g., a few grams) VDF polymerizations at ambient temperature in inexpensive, low pressure glass tubes, and also large scale VDF polymerizations, for example, in industrial settings. The glass tubes as well as metal reactors could also take advantage of photochemistry.

The present disclosure also provides many additional advantages, which shall become apparent as described below.

SUMMARY OF THE DISCLOSURE

This disclosure addresses the problems above. Milder means of radical generation and have been developed including examples of transition metal mediated, controlled, and respectively free radical VDF polymerizations (VDF-IDT-CRP and VDF-FRP), carried out at 40° C. in low pressure glass tubes, and using a $Mn_2(CO)_{10}$ visible light photocatalyst in conjunction with perfluoroalkyl iodides and respectively, with a wide variety of other alkyl halides. Moreover, the complete activation of both $P_n—CH_2—CF_2—I$ and $P_m—CF_2—CH_2—I$ PVDF chain ends has been demonstrated, towards the synthesis of well-defined PVDF block copolymers, as described in copending U.S. Provisional Patent Application Ser. No. 61/602,409, supra.

$Mn_2(CO)_{10}$ experiments have been conducted that reveal that since VDF is a very reactive monomer, only highly reactive radicals such as $R_F·$ or $CX_3·$ (X=H, F, Cl) were capable of rt initiation. Thus, although many halides were tested, the only effective initiators were $R_F—X$ or $X—R_F—X$ (X=Cl, Br, I) and respectively $CH_3—I$, $CF_3—I$, $CF_3—SO_2—Cl$, $CCl_4$ and $CCl_3Br$, where $CF_3$—I and $CF_3$—$SO_2$—Cl also provided examples of $Mn_2(CO)_{10}$-catalyzed alkene TFM, as described in copending U.S. Provisional Patent Application Ser. No. 61/602,409, supra.

In accordance with this disclosure, for radical chemistry applications, carboxylate HVIs are protected synthetic equivalents of their unstable/explosive corresponding diacylperoxides, where $R_F$. or $CX_3$. radicals, inaccessible via $R_F/CX_3$—CO—O—O—CO—$CX_3/R_F$, become readily available via rt photolysis of the stable, corresponding $R_F/CX_3$—CO—O—I(Ph)-O—CO—$CX_3/R_F$ or Ph(COO)I $(OCOCX_3/R_F)_3$ HVI derivatives. Moreover, any such HVIs can also be generated in situ from $R_F/CX_3COOH$ and catalytic PhI using Oxone. Thus while typical room temperature free radical azo or peroxide initiators are expensive, hazardous and require refrigeration, the analogous HVI carboxylates are much more stable and convenient.

HVIs carboxylates are a new class of initiators for the rt FRP of alkene monomers, and, in conjunction with the appropriate mediators, of the corresponding controlled radical polymerizations. IFAB as the least expensive and most convenient source of $CF_3$. and of $CF_3I$. In an embodiment, IFAB is useful as a TFM agent using the more difficult VDF as a model monomer, in a metal free, organocatalysis of FM-CRP.

This disclosure provides novel radical trifluromethylations with the $(CF_3COO)_2I^{III}Ph$. In accordance with this disclosure, commercially available [bis(acyloxy)iodo]arenes $((CX_3COO)_2I^{III}Ph$ and the Dess Martin-$(CX_3COO)_3IPh$ are useful as initiators for the polymerization of VDF at mild temperatures. This discosure also involves $R_F$. or R. that can also be derived from the rt photolysis of novel VDF initiators such as hypervalent iodides (HVIs, $(CF_3/CH_3COO)_2IPh'$ eq. 3). In accordance with this disclosure, a much more convenient $CX_3$. source can be provided by inexpensive, commercially available hypervalent iodides ($I^{III}$) (HVI—X, X=H, F) such as $(CX_3COO)_2IPh$ or the Dess-Martin reagent. FHVI can be used as the cheapest for both radical trifluoromethylation of various substrates, as well as trifluoromethyl initiation of radical polymeriztions.

This disclosure relates in part to a process comprising polymerizing at least one unsaturated monomer, e.g., alkene monomer, in the presence of a hypervalent iodide radical initiator and optionally a solvent. The process is conducted under reaction conditions and for a time sufficient to polymerize the at least one unsaturated monomer to form a polymer.

This disclosure also relates in part to a process comprising polymerizing at least one unsaturated monomer, e.g., alkene monomer, in the presence of a hypervalent iodide radical initiator, a solvent, and an iodine source. The process is conducted under reaction conditions and for a time sufficient to controllably polymerize the at least one unsaturated monomer to form a polymer.

This disclosure further relates in part to a process comprising providing an iodide terminated polymer; converting the iodide terminated polymer to a hypervalent iodide radical initiator; and polymerizing at least one unsaturated monomer, e.g., alkene monomer, in the presence of the hypervalent iodide radical initiator, an optional catalyst and a solvent. The process is conducted under reaction conditions and for a time sufficient to polymerize the at least one unsaturated monomer to form a block polymer.

This disclosure yet further relates in part to polymers, random copolymers and block copolymers produced by the above described processes.

The disclosure describes hypervalent iodide radical initiators for the room temperature radical thermal and photo-chemical polymerization of alkenes, and especially fluorine substituted alkenes. The radical thermal and photopolymerization can also be carried out at higher or lower temperatures than room temperature. The present disclosure provides a method for living polymerization of alkene monomers, which provides a high level of macromolecular control over the polymerization process and which leads to uniform and controllable polymeric products. Hypervalent iodide derivatives are a unique methodology to achieve initiation of the polymerization process, either thermally or preferably under visible or ultraviolet initiation.

Further objects, features and advantages of the present disclosure will be understood by reference to the following drawings and detailed description.

BRIEF DESCRIPTION OF THE DRAWINGS

FIG. 3 also explains the analogy between VDF/RI/$(CF_3COO)_2$I-Ph=VDF/$CF_3I$/$(CF_3COO)_2$I-Ph.

FIG. 6 sets forth the characterization of selected examples of PVDF-I polymers synthesized using hypervalent iodides and various iodine sources in accordance with Example 7.

DETAILED DESCRIPTION OF THE PREFERRED EMBODIMENT

Figure 1:
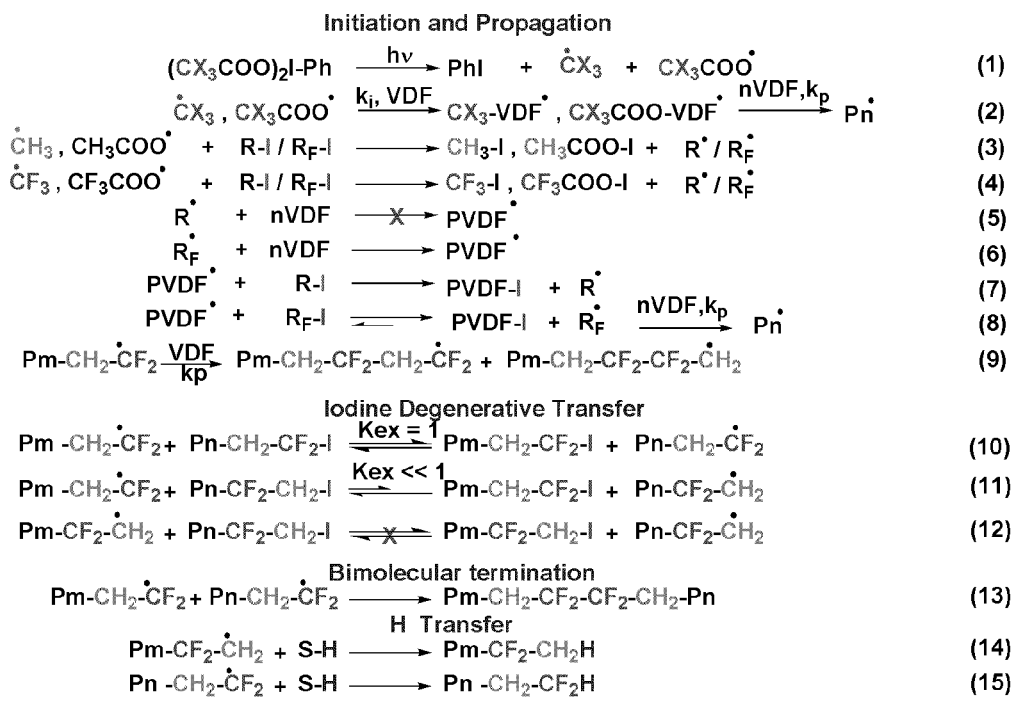
FIG. 1 depicts a generalized mechanism for polymerization of vinylidene fluoride (VDF) initiated from $(CR_3COO)_2$I-Ph.

As used herein, the term "polymerization" includes oligomerization, cooligomerization, polymerization and copolymerization. The copolymerization can be block or random.

As used herein, the term "polymer" includes oligomer, cooligomer, polymer and copolymer. The copolymer can be block or random.

As used herein, the term "hydrocarbon" includes any permissible group containing carbon and hydrogen atoms, in particular, groups or substituents having from about 1 to about 24 or more carbon atoms. The hydrocarbon can be substituted (e.g., fluorohydrocarbon) or unsubstituted. As used herein, . refers to a radical.

As used herein, the term "polymer" includes molecules of varying sizes having at least two repeating units. Most generally polymers include copolymers which may in turn include random or block copolymers. Specifically, "polymer" includes oligomers (molecules having from 2-10 repeating units). Polymers formed using the disclosure have varying degrees of polymerization (number of monomer units attached together), for example from 2-10; 11-25; 26-100; 101-250; 251-500; 501-750; 751-1000; 1,000-2,000; and even larger; and all individual values and ranges and subranges therein, and other degrees of polymerization. As known in the art, the degree of polymerization can be modified by changing polymerizing conditions.

As known in the art, there are different measures of molecular weight of polymers: average molecular weight ($M_w$, the weight-average molecular weight, or $M_n$, the number-average molecular weight) and molecular weight distribution ($M_w/M_n$, a measure of polydispersity because $M_w$ emphasizes the heavier chains, while $M_n$ emphasizes the lighter ones). The number average molecular weight is the average of the molecular weights of the individual polymers in a sample. The number average molecular weight is determined by measuring the molecular weight of n polymer molecules, summing the weights, and dividing by n. The weight average molecular weight ($M_w$) is calculated by $$\overline{M}_w = \frac{\sum_i N_i M_i^2}{\sum_i N_i M_i}$$

where $N_i$ is the number of molecules of molecular weight $M_i$. The polydispersity index (PDI) is a measure of the distribution of molecular weights of the polymer and is the weight average molecular weight divided by the number average molecular weight. As the chains approach uniform chain length, the PDI approaches 1. The degree of polymerization is the total molecular weight of the polymer divided by the molecular weight of the monomer and is a measure of the number of repeat units in an average polymer chain. As described elsewhere herein, the average molecular weights of the polymers produced can vary, depending on the polymerizing conditions, and other factors, as known in the art.

As used herein, "initiators" are those substances which act spontaneously or can be activated with light or heat to initiate polymerization of the alkene monomer. Examples of initiators include hypervalent iodide radical initiators. Some initiators are activated by irradiation with light. Light used in the disclosure includes any wavelength and power capable of initiating polymerization. Preferred wavelengths of light include ultraviolet or visible. Any suitable source may be used, including laser sources. The source may be broadband or narrowband, or a combination. The light source may provide continuous or pulsed light during the process.

As used herein, "polymerizing conditions" are the temperature, pressure and the presence of an initiator that result in a detectable amount of polymer formation. Useful temperatures for polymerization are easily determined by one of ordinary skill in the art without undue experimentation in further view of the description herein. Ambient temperature may be used. In industrial use, a temperature of between about 50° C. and 100° C. is particularly useful since reaction heat can be removed easily. One example of polymerizing conditions is a temperature below the temperature at which the initiator ordinarily decomposes. Useful pressures for polymerization are readily determined by one of ordinary skill in the art without undue experimentation in further view of descriptions herein. Ambient atmospheric pressure may be used. It is known that polymerizing conditions can vary depending on the desired product. Any combination of pressure and temperature which produce a detectable amount of polymer can be used in the methods described here.

According to the present disclosure, a polymerization process is described for conducting polymerization of monomers, particularly "living" polymerization of alkenes, wherein a unique initiator, i.e., hypervalent iodide radical initiator, is provided for producing oligomers and polymers with controlled structure. In the context of the present disclosure, the term "living" refers to the ability to produce a product having one or more properties which are reasonably close to their predicted value. The polymerization is said to be "living" if the resulting number average molecular weight is close to the predicted molecular weight based on the ratio of the concentration of the consumed monomer to the initiator; e.g., within an order of magnitude, preferably within a factor of five, more preferably within a factor of 3, and most preferably within a factor of two, and to produce a product having narrow molecular weight distribution as defined by the ratio of weight average molecular weight to number molecular weight (MWD); e.g., less than 10, preferably less than 2, more preferably less than 1.5, most preferably less than 1.3.

The hypervalent iodide radical initiators useful in this disclosure can be classified based on the number of carbon ligands on the central iodine. Iodinanes include 1C bonds (iodosyl/iodoso compounds (RIO) and their derivatives ($RIX_2$ where X is non-carbon ligand and R is aryl or $CF_3$), 2C bonds (iodonium salts ($R_2I^+X^-$), and 3C bonds (iodanes with 3 C—I bonds are thermally unstable and not synthetically useful). Periodinanes include 1C bond (iodyl/iodoxy compounds ($RIO_2$) and their derivatives ($RIX_4$ or $RIX_2O$), and 2C bonds (iodyl salts ($R_2IO^+X^-$). An illustrative periodinane is Dess-Martin periodinane (1,1,1-triacetoxy-1,1-dihydro-1,2-benziodoxol-3(1H)-one).

Other hypervalent iodide radical initiators useful in this disclosure include compounds with more than one formal carbon bond to iodine. Such initiators include alkenyliodonium ($PhI^+C=CHR\ X^-$) and alkynyliodonium ($PhI^+C\equiv CHR\ X^-$) salts, and iodonium ylides ($PhI=CXY$ where X and Y are electron acceptors).

Cyclic iodinanes are hypervalent iodide radical initiators useful in this disclosure. Such initiators include $\lambda^3$-iodinanes (benziodoxazoles based on o-iodosobenzoic acid) and $\lambda^5$-iodinanes (benziodoxazoles based on o-iodoxybenzoic acid). An illustrative cyclic iodinane is Dess-Martin periodinane (1,1,1-triacetoxy-1,1-dihydro-1,2-benziodoxol-3(1H)-one).

μ-Oxo-bridged iodanes are hypervalent iodide radical initiators useful in this disclosure. Such initiators include $PhI=(X)OI(X)Ph$ where X is OTf, $ClO_4$, $BF_4$, $PF_6$ or $SbF_6$.

The hypervalent iodide radical initiators useful in this disclosure include, for example, [bis(trifluoroacetoxy)iodo]benzene, [bis(trifluoroacetoxy)iodo]pentafluorobenzene, [bis(acetoxy)iodo]benzene, and the Dess-Martin periodinane (1,1,1-triacetoxy-1,1-dihydro-1,2-benziodoxol-3(1H)-one). The amount of hypervalent iodide radical initiator useful in the process of this disclosure is dependent on the amount of polymerizable monomer or monomers used. The polymerizable monomer or monomers can be used in a total amount of generally from 3-20,000 moles, preferably 5-2,000 moles, more preferably 10-1,000 moles per mole of the hypervalent iodide radical initiator.

Hypervalent iodides (HVI) can be derived by ligand exchange with RCOOH, or can be made in situ using catalytic PhI with an oxidant like oxone. Also, HVI exchanges with a variety of RYH (Y=N, O, etc.) and generates in situ other radicals that can be used for initiation. Perfluorinated iodides (RFIs) can be used as chain transfer agents.

Unless PVDF-derived HVI-like iodonium compounds are able to mediate degenerative transfer, an iodine source ($R_F/R_H$—$I/I_2$/metal iodide, etc), is necessary for control, e.g., controlled polymerizations obtained using $(CF_3COO)_2IPh$ and $R_F$—I, (e.g., I—$(CF_2)_n$—I), $I_2$ or RI ($CHI_3$, $CI_4$, allyl iodide, CN—$CH_2I$, benzyl iodide, N-iodosuccinimide, $Bu_3SnI$, $Me_2SnI_2$, $Bu_4NI$, $Ph_4PI$) or MtI ($GeI_4$, $PbI_4$, NaI, KI, LiI, $BiI_3$, CsI, $CsI_3$, $InI_3$ etc.) the like.

Figure 2:
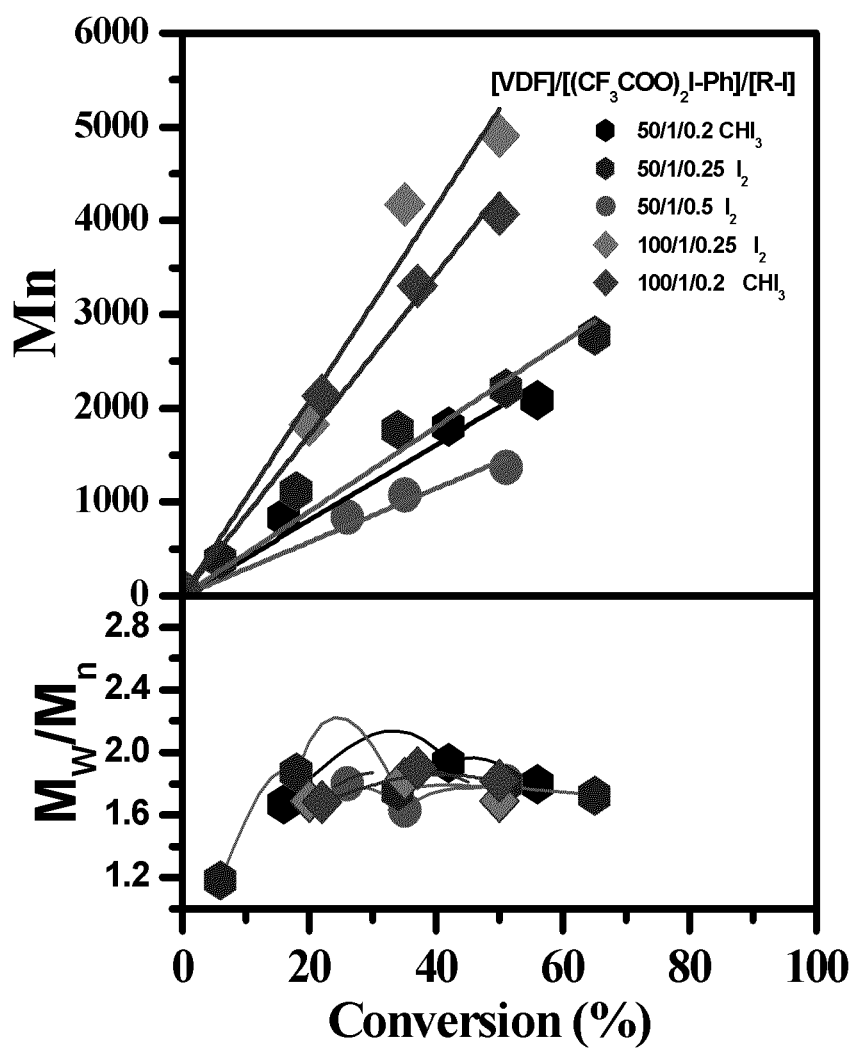
FIG. 2 graphically depicts the dependence of Mn and Mw/Mn on conversion in the VDF polymerization initiated from $(CF_3COO)_2$I-Ph and using $I_2$ and $CHI_3$ as iodine sources.
Figure 3:
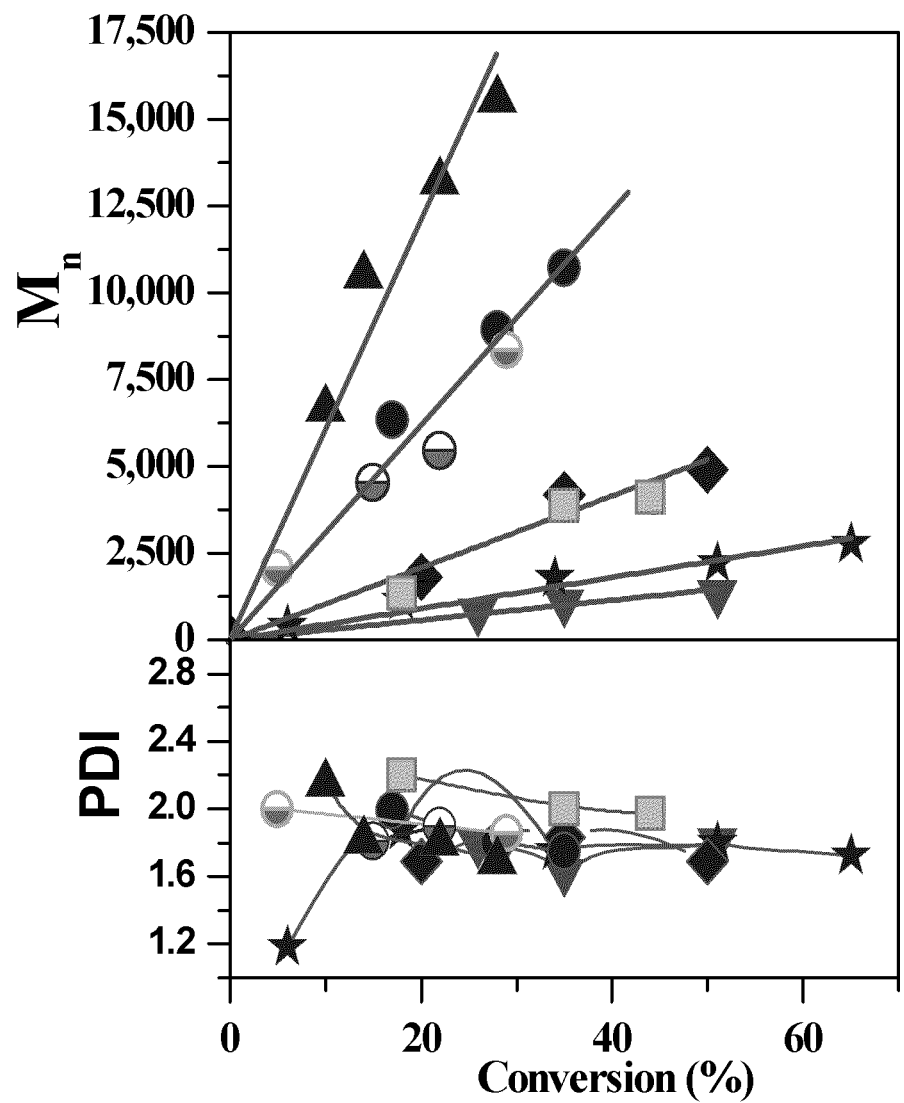
FIG. 3 graphically depicts the dependence of Mn and Mw/Mn on conversion in the VDF polymerization initiated from $(CF_3COO)_2$I-Ph and using $I_2$.

Illustrative iodine sources useful in the process of this disclosure include, for example, $I_2$, $CHI_3$, $CI_4$, $GeI_4$, $PbI_4$, benzyl iodide, N-iodosuccinimide, $GeI_4$,$PbI_4$, NaI, KI, LiI, $BiI_3$, CsI, $CsI_3$, $InI_3$, $Bu_3SnI$, $Me_2SnI_2$, $Bu_4NI$, $Ph_4PI$, and the like as well as perfluorinated iodide chain transfer agents such as $I(CF_2)_6I$. The iodine sources can be used in amounts sufficient to provide a controlled polymerization according to the iodine degenerative transfer mechanism. Example 3 hereinbelow shows the results of photopolymerizations of VDF at 40° C. that were conducted with $(CF_3COO)_2I$-Ph. The dependence of Mn and Mw/Mn on conversion in the VDF polymerization initiated from $(CF_3COO)_2I$-Ph and using $I_2$ and $CHI_3$ as iodine sources is shown in FIG. 2. The dependence of Mn and Mw/Mn on conversion in the VDF polymerization initiated from $(CF_3COO)_2I$-Ph, $(CH_3COO)_2I$-Ph and $(CH_3COO)_2I(-PhCOO—)$ and using $I(CF_2)_6I$ as iodine source is shown in FIG. 3. The linear dependence of Mn on conversion and narrow Mw/Mn in both figures confirm the controlled character of these polymerizations.

In the present disclosure, polymers with various specifically desired structures and architectures can be purposely produced. In terms of topology, such structures and architectures may include linear, star, comb, hyperbranched, dendritic, cyclic, network, and the like. In terms of sequence/composition distribution such structures and architectures may include homopolymer, random copolymer, block copolymer, graft copolymer, gradient copolymer, tapered copolymer, periodic copolymer, alternating copolymer, and the like.

In the present disclosure, any alkene monomers that are radically polymerizable or copolymerizable can be polymerized and/or copolymerized in the presence of the hypervalent iodide radical initiator. Illustrative alkene monomers include, for example, ethylene, propylene, 1-butene, 3-methyl-1-butene, 1-pentene, 2-methyl-1-pentene, 4-methyl-1-pentene, 1-hexene, 1-heptene, 1-octene, 2-methyl-1-octene, 2-ethyl-1-hexene, 5-methyl-1-heptene, 1-nonene, 1-decene, 1-undecene, 1-dodecene, 2-methyl-1-dodecene, 1-tetradecene, 2-methyl-1-tetradecene, 1-hexadecene, 2-methyl-1-hexadecene, 5-methyl-1-hexadecene, 1-octadecene, 2-methyl-1-octadecene, 1-eicosene, 2-methyl-1-eicosene, 1-docosene, 1-tetracosene, 1-hexacosene, vinylcyclohexane and 2-phenyl-1-butene, although the present disclosure is in no way limited to these examples. The alkene monomers to be polymerized by the process of the present disclosure may be linear or branched and may also contain a cycloaliphatic or aromatic ring structure. These monomers can be used singly or as admixture of two or more than two.

In a preferred embodiment, the alkene monomers are fluorine substituted alkene monomers. Illustrative fluorine substituted alkene monomers include, for example, vinylidene fluoride (VDF), hexafluoropropene, tetrafluoroethylene, trifluorochloroethylene, $CF_2=CCl_2$, $CH_2=CFCl$, $CF_2=CFX$ (where X is Cl or Br), $CH_2=CX_2$ (where X is F, Cl or Br), and $CH_2=CHX$ (where X is F, Cl or Br). These monomers can be used singly or as admixture of two or more than two. Suitable alkene monomers include any permutation of alkenes with halides, e.g., halogenated alkenes having the formula $CH_2=CHX$, $CH_2=CX_2$, $CHX=CY_2$, $CHX=CYX$, $CX_2=CY_2$, and $CXY=CY_2$ (where X and Y are independently F, Cl, Br, or I).

In accordance with this disclosure, other monomers, e.g., vinyl monomers, can be polymerized and/or copolymerized in the presence of the hypervalent iodide radical initiator. Examples of the monomers include but not limited to: carboxyl group-containing unsaturated monomers such as acrylic acid, methacrylic acid, crotonic acid, itaconic acid, maleic acid, fumaric acid, and the like (preferably methacrylic acid), $C_{2-8}$ hydroxyl alkyl esters of (meth)acrylic acid (preferably methacrylic acid) such as 2-hydroxylethyl(meth)acrylate, 2-hydroxylpropyl(meth)acrylate, 3-hydroxypropyl (meth)acrylate, hydroxybutyl(meth)acrylate and the like, monoesters between a polyether polyol (e.g., polyethylene glycol, polypropylene glycol or polybutylene glycol) and an unsaturated carboxylic acid (preferably methacrylic acid); monoethers between a polyether polyol (e.g., polyethylene glycol, polypropylene glycol or polybutylene glycol) and a hydroxyl group-containing unsaturated monomers (e.g., 2-hydroxyl methacrylate); adducts between an unsaturated carboxylic acid and a monoepoxy compound; adducts between glycidyl(meth)acrylates (preferably methacrylate) and a monobasic acid (e.g., acetic acid, propionic acid, p-t-butylbenzonic acid or a fatty acid).

Other monomers include, for example, monoesters or diesters between an acid anhydride group-containing unsaturated compounds (e.g., maleic anhydride or iraconic anhydride) and a glycol (e.g. ethylene glycol, 1,6-hexanediol or neopentyl glycol); chlorine-, bromine-, fluorine-, and hydroxyl group containing monomers such as 3-chloro-2-hydroxylpropyl(meth)acrylate (preferably methacrylate) and the like; $C_{1-24}$ alkyl esters or cycloalkyl esters of (meth) acrylic acid (preferably methacrylic acid), such as methyl methacrylate, ethyl methacrylate, propyl methacrylate, isopropyl methacrylate, n-, sec-, or t-butyl methacrylate, hexyl methacrylate, 2-ethylhexyl methacrylate, octylmethacrylate, decyl methacrylate, lauryl methacrylate, stearyl methacrylate, cyclohexyl methacrylate and the like, $C_{2-18}$ alkoxyalkyl esters of (meth)acrylic acid (preferably methacrylic acid), such as methoxybutyl methacrylate, methoxyethyl methacrylate, ethoxyethyl methacrylate, ethoxybutyl methacrylate and the like; olefins or diene compounds such as ethylene, propylene, butylene, isobutene, isoprene, chloropropene, fluorine containing olefins, vinyl chloride, and the like.

Still other monomers include, for example, ring-containing unsaturated monomers such as styrene and o-, m-, p-substitution products thereof such as N,N-dimethylaminostyrene, aminostyrene, hydroxystyrene, t-butylstyrene, carboxystyrene and the like, a-methyl styrene, phenyl(meth)acrylates, nitro-containing alkyl(meth)acrylates such as N,N-dimethylaminoethyl methacrylate, N-t-butylaminoethyl methacrylate; 2-(dimethylamino)ethyl methacrylate, methyl chloride quaternized salt, and the like; polymerizable amides such as (meth)acrylamide, N-methyl(meth)acrylamide, 2-acryloamido-2-methyl-1-propanesulfonic acid, and the like; nitrogen-containing monomers such as 2-, 4-vinyl pyridines, 1-vinyl-2-pyrrolidone, (meth)acrylonitrile, and the like; glycidyl group-containing vinyl monomers such as glycidyl(meth) acrylates and the like, vinyl ethers, vinyl acetate, and cyclic monomers such as methyl 1,1-bicyclobutanecarboxylate. These monomers can be used singly or as admixture of two or more than two.

The unsaturated monomers useful in this disclosure may homopolymerize or copolymerize. Fluorine substituted unsaturated monomers, e.g., fluorine substituted alkene, acrylic acid and styrene derivatives, and vinyl ether monomers, are useful in this disclosure. Suitable unsaturated monomers useful in this disclosure include, for example, any permutation of alkenes with halides as well as fluorinated acrylates, styrenes, vinyl ethers, and the like.

The polymerizable monomer or monomers can be used in a total amount of generally from 3-20,000 moles, preferably 5-2,000 moles, more preferably 10-1,000 moles per mole of the hypervalent iodide radical initiator. In an embodiment, the polymerizable monomer or monomers can be used in a total amount of from 1 to about 10,000 moles per mole of the hypervalent iodide radical initiator. The molecular weight distribution of resultant polymer (defined by the ratio of weight average molecular weight to number average molecular weight) obtained from processes of the present disclosure is generally from 1.01 to 30, mostly from 1.05 to 3.0, and more preferably less than 2.0.

Various organic or inorganic functional groups can be introduced to the ends of formed polymer or copolymer. By definition, a functional group is a moiety attached to a molecule that performs a function in terms of the reactivity and/or the physical properties of the molecule bearing it. Example of functional groups include but not limited to: halogens (e.g., Cl, Br, I), hydroxyl (—OH) groups such as —$CH_2$ OH, —$C(CH_3)_2$ OH, —$CH(OH)CH_3$, phenol and the like, thiol (—SH) groups, aldehyde (—CHO) and ketone (>C=O) groups, amine (—$NH_2$) groups, carboxylic acid and salt (—COOM) (M is H, alkali metal or ammonium), sulfonic acid and salt (—$SO_3$ M) (M is H, alkali metal or ammonium), amide (—$CONH_2$), crown and kryptand, substituted amine (—$NR_2$) (R is H or $C_{1-18}$ alkyl), —C=CR', —CH=CHR'(R' is H or alkyl or aryl or alkaryl or aralkyl or combinations thereof), —COX (X is halogen), —$CH_2$ N$(SiR'_3)_2$, —Si $(OR')_3$, —CN, —$CH_2$ NHCHO, —B$(OR)_2$, —$SO_2$ Cl, —$N_3$, —MgX. Functionalized polymer and copolymers including macromonomer prepared in accordance with the disclosure may be obtained by two ways: (a) one-pot synthesis using functional initiator; (b) transformation of living or preformed polymer to a desirable functional group by known organic reactions.

In an embodiment of this disclosure, a process is provided that allows the synthesis of well-defined block copolymers of VDF with many other monomers. The process comprises providing an iodide terminated polymer, converting the iodide terminated polymer to a hypervalent iodide radical initiator; and polymerizing at least one alkene monomer in the presence of the hypervalent iodide radical initiator, optionally a catalyst and a solvent, under reaction conditions and for a time sufficient to polymerize the at least one alkene monomer to form a polymer.

The iodide terminated polymer can comprise PVDF-$CF_2$—$CH_2$—I and/or PVDF-$CH_2$—$CF_2$—I, and the hypervalent iodide radical initiator can comprise PVDF-I(OOCR)$_2$ where R is alkyl or perfluoroalkyl. The catalyst can comprise $Mn_2(CO)_{10}$ or $Re_2(CO)_{10}$. The polymerization can be conducted at room temperature under visible light or UV light. The polymers contain iodide terminal groups that which allow the synthesis of block copolymers.

In an embodiment, the iodo chain ends can be activated with manganese carbonyl (or other transition metal carbonyl known to photolyze) directly, or as described in copending U.S. Provisional Patent Application Ser. No. (0008247USP), filed on an even date herewith, which is incorporated herein in its entirety. There is no need for a hypervalent iodide radical initiator. In another embodiment, the iodine chain ends can be converted to hypervalent iodide radical initiators and they may be activated photo or thermally to make block copolymers.

Various polymerization technologies can be used to make the polymer, which include but not limited to: bulk polymerization, solution polymerization, emulsion polymerization, suspension polymerization, dispersion polymerization, precipitation polymerization, template polymerization, microemulsion polymerization. The polymerization will work with any radically polymerizable monomer. Various solvents can be used in the polymerization. Examples of the solvents are but not limited to: carbonates, e.g., dimethyl carbonate (DMC), acetonitrile, water, aliphatic solvent, aromatic solvent, hetero-atom containing solvent, supercritical solvent (such as $CO_2$), and the like. The inventive process can typically be conducted between −80° C. and 280° C., preferably between 0° C. and 180° C., more preferably between 20° C. and 150° C., most preferably between 20° C. and 130° C. The inventive process can be conducted under a pressure from 0.1 to 50,000 kPa, preferably from 1 to 1,000 kPa. The addition order of various ingredients in according with the process of the disclosure can vary and generally do not affect the outcome of the living polymerization. Depending the expected molecular weight and other factors, polymerization time may vary from 10 seconds to 100 hours, preferably from 1 minute to 48 hours, more preferably from 10 minutes to 24 hours, most preferably from 30 minutes to 18 hours. The polymerization procedure can consist of mixing the desired monomer and the hypervalent iodide radical initiator in predetermined ratios and in appropriate solvents for a given amount of time under visible or UV irradiation.

The final polymer can be used as it is or is further purified, isolated, and stored. Purification and isolation may involve removing residual monomer, solvent, and catalyst. The purification and isolation process may vary. Examples of isolation of polymers include but not limited to precipitation, extraction, filtration, and the like. Final polymer product can also be used without further isolation such as in the form of the latex or emulsion.

Polymers prepared with the inventive process may be useful in a wide variety of applications. The examples of these applications include, but not limited to, adhesives, dispersants, surfactants, emulsifiers, elastomers, coating, painting, thermoplastic elastomers, diagnostic and supporters, engineering resins, ink components, lubricants, polymer blend components, paper additives, biomaterials, water treatment additives, cosmetics components, antistatic agents, food and beverage packaging materials, release compounding agents in pharmaceuticals applications.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

EXAMPLE 1

As shown in FIG. 1, initiation begins with the thermal or fotolytical cleavage of the HVI initiator, (in this case exemplified by the commercially available $(CX_3COO)_2IPh$ where X=H or F, equation 1) which generates the $CX_3$ and/or the $CX_3COO$ radicals which add to VDF (equation 2), thereby initiating the polymerization, which can be free radical. If a living polymerization is desired, iodine sources such as R—I or $R_F$—I or MtI where $R_F$ represents a fluorinated or semifluorinated fragment, are used (equations 3 and 4). For regular R—I such as allyl iodide or $CHI_3$, or I, it is expected that the R* radical is not able to add to VDF (equation 5), whereas $R_F$* radicals such as $CF_3$—$(CF_2)_n$—$CF_2$* are reactive enough to add to VDF (equation 8) and also engage in the iodine degenerative process (equation 8) which mediates the liing nature of the polymerization.

Under these conditions, VDF polymerization proceeds with the formation of two types of terminal iodine chain ends, namely PVDF-CH$_2$—CF$_2$—I and PVDF-CF$_2$—CH$_2$—I. The degenerative iodine transfer process is supported mainly by the more reactive PVDF-CH$_2$—CF$_2$—I chain ends (equations 10-12), and proceeds with the accumulation of the less reactive PVDF-CF$_2$—CH$_2$—I chain ends.

Finally, a minor extent of termination via bimolecular recombination (equation 13) or chain transfer to the solvent (equations 14 and 15) is also possible.

EXAMPLE 2

While VDF initiation does occur from the very expensive perfluorinated peroxides, in accordance with this disclosure, the R$_F$· source can be provided by inexpensive, commercially available hypervalent iodides such as (CF$_3$COO)$_2$IPh. Although photo/thermal radical generation from (CH$_3$/CF$_3$COO)$_2$IPh was employed in organic chemistry or for initiating free radical polymerization (FRP), HVIs were never used with fluorinated monomerss. In accordance with this disclosure, PVDF can be obtained from (CF$_3$OOC)$_2$IPh at room temperature under ultraviolet (UV) or visible light irradiation, with CF$_3$· initiation confirmed by NMR. HVIs thus cleanly provide an excellent model initiator for benchmark testing various Q-I iodine donors. However, unless PVDF-derived HVI-like iodonium compounds are able to mediate degenerative transfer, an iodine source (R$_F$/R$_H$—I/I$_2$), is necessary for control, e.g., controlled polymerizations obtained using (CF$_3$COO)$_2$IPh and I$_2$ or CHI$_3$.

EXAMPLE 3

FIG. 2 graphically depicts results of the dependence of Mn and Mw/Mn on conversion in the VDF polymerization initiated from (CF$_3$COO)$_2$I-Ph and using I$_2$ and CHI$_3$ as iodine sources.

EXAMPLE 4

FIG. 3 graphically depicts the dependence of Mn and Mw/Mn on conversion in the VDF polymerization initiated from (CF$_3$COO)$_2$I-Ph and using I$_2$. FIG. 3 also explains the analogy between VDF/RI/(CF$_3$COO)$_2$I-Ph=VDF/CF$_3$I/(CF$_3$COO)$_2$I-Ph. Since CF$_3$—I is generated in situ, (Scheme 1, eq. 4), the equivalent ratios with CF$_3$—I are also included. [VDF]/["CF$_3$I"]/[(CF$_3$COO)$_2$IPh] (or [VDF]/[I$_2$]/[(CF$_3$COO)$_2$IPh]): 50/1/0.5 (▼, 50/0.5/1), 100/1/1.5 (★, 50/0.25/1), 200/1/1.5 (♦, 100/0.25/1), 500/1/0.5 (⊖, 250/0.25/0.5), 500/1/1 (○, 250/0.25.0.75), 500/1/1.5 (●, 250/0.25/1) and 1,000/1/1.5 (▲, 500/0.25/1). Also included is [VDF]/[CF$_3$(CF$_2$)$_3$I]/[IFAB]=200/1/0.25 (■).

EXAMPLE 5

Figure 4:
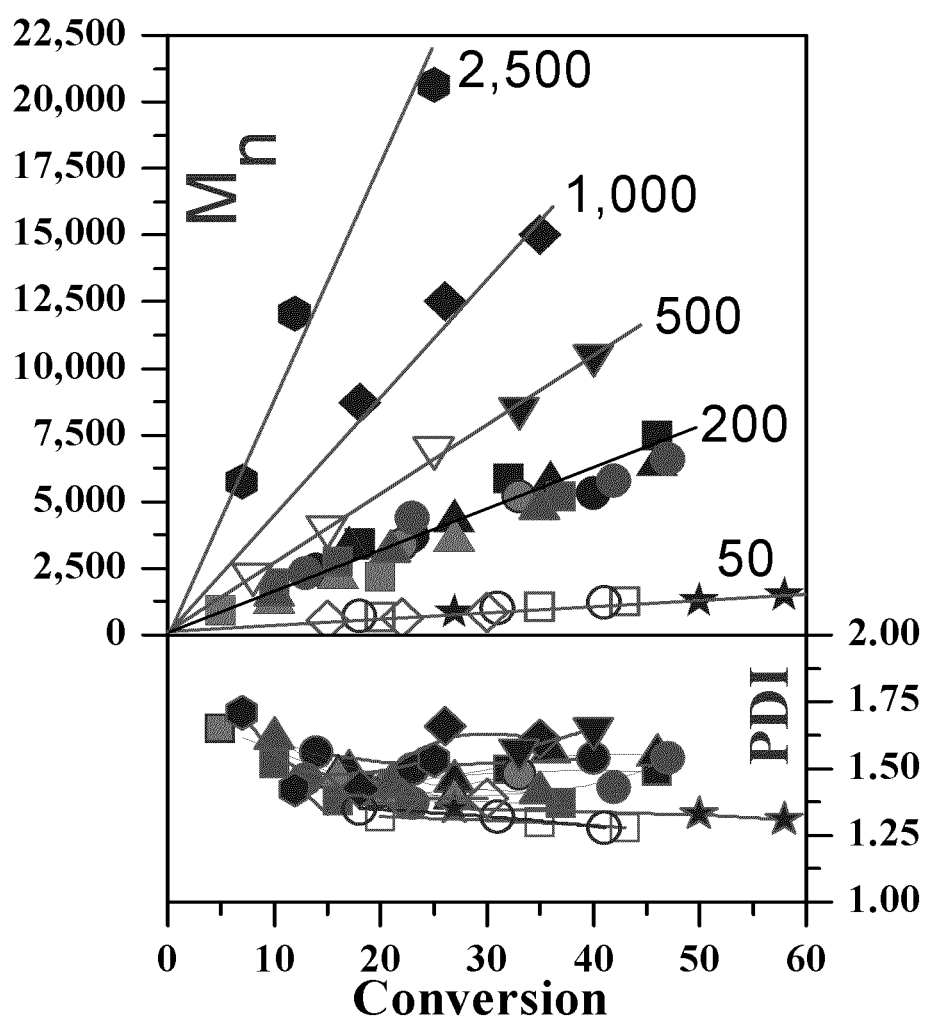
FIG. 4 graphically depicts the dependence of Mn and Mw/Mn on conversion in the VDF polymerizations initiated from $(CF_3COO)_2$I-Ph and using $I(CF_2)_6I$.

FIG. 4 graphically depicts the dependence of Mn and Mw/Mn on conversion in the VDF polymerizations initiated from (CF$_3$COO)$_2$I-Ph and using I(CF$_2$)$_6$I. The effect of monomer/initiator ratio (DP, degree of polymerization) is as follows: [VDF]/[I(CF$_2$)$_6$I]/[(CF$_3$COO)$_2$IPh]=50/1/0.25 (★); 200/1/0.25 (■), 500/1/0.25 (▽), 500/1/1 (▼); 1,000/1/1 (♦); 2,500/1/1 (⬢). The effect of initiator at constant DP is as follows: [VDF]/[I(CF$_2$)$_6$I]/[(CF$_3$COO)$_2$IPh; (CH$_3$COO)$_2$IPh; (CH$_3$COO)$_3$I(-PhCOO—)]=200/1/0.25 (■), 200/1/0.5 (▲) and 200/1/1 (●). [VDF]/[I(CF$_2$)$_6$I]/[HVI]=50/1/0.1; CF$_3$COO)$_2$IPh, (□), (CH$_3$COO)$_2$IPh, (○), CH3COO)$_3$I(-PhCOO—). (◇).

EXAMPLE 6

Figure 5:
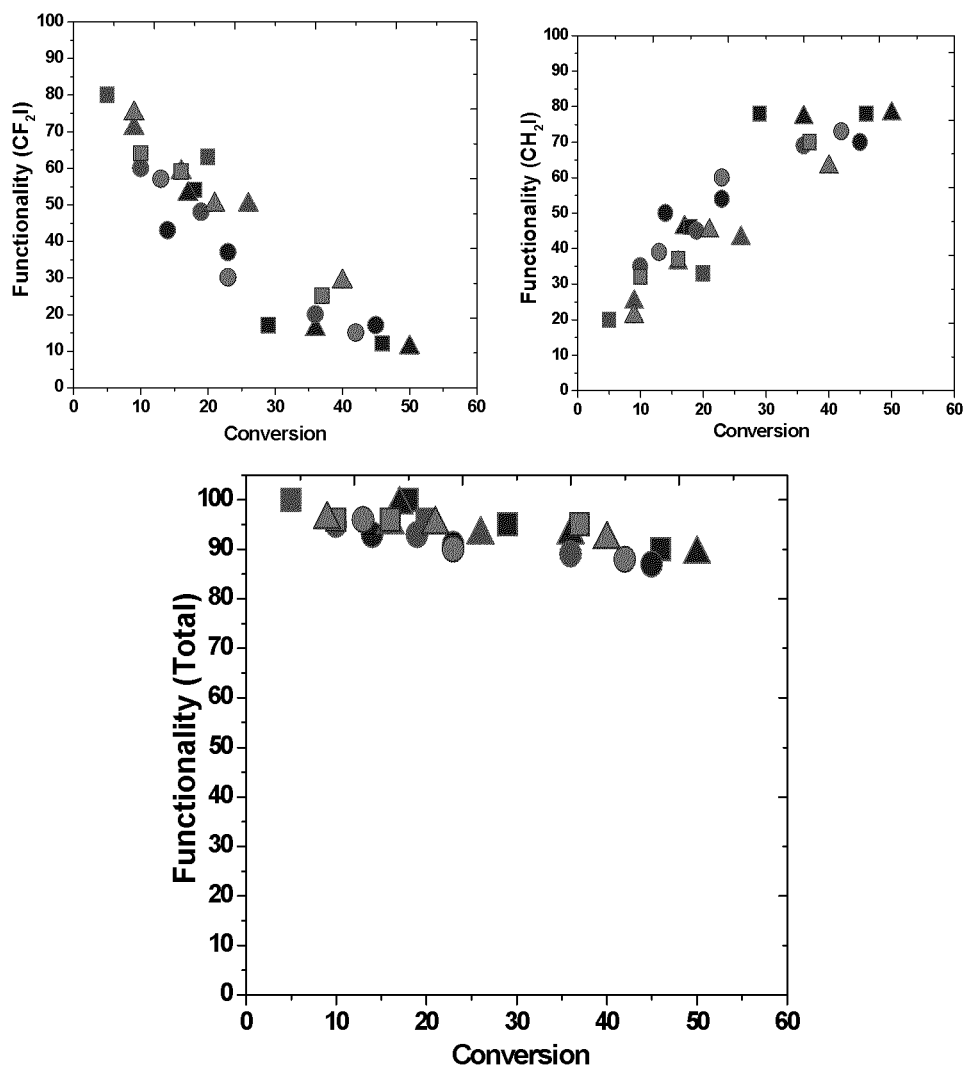
FIG. 5 graphically depicts the dependence of the nature of the PVDF-I chain ends on conversion, and demonstrates that the polymers made herein are adequate for block copolymer synthesis.

FIG. 5 graphically depicts the dependence of the nature of the PVDF-I chain ends on conversion, and since the total functionality is at least 90%, demonstrates that the polymers made herein are adequate for block copolymer synthesis. [VDF]/[I(CF$_2$)$_6$I]/[CF$_3$COO)$_2$IPh; (CH$_3$COO)$_2$IPh; CH$_3$COO)$_3$I(-PhCOO—))=200/1/0.25 (■), 200/1/0.5 (▲) and 200/1/1 (●).

EXAMPLE 7

Photopolymerizations of VDF at 40° C. were conducted with (CF$_3$COO)$_2$I-Ph. FIG. 6 sets forth the results of characterization of selected examples of PVDF-I polymers synthesized using hypervalent iodides and various iodine sources.

EXAMPLE 8

A PVDF homopolymerization can be carried out as described below. In a typical reaction, a 35-mL Ace Glass 8648 #15 Ace-Thread pressure tube equipped with a bushing, and plunger valve with two O-rings and containing a magnetic stir bar, (CF$_3$COO)$_2$I-Ph, (0.22 g, 0.51 mmol) and solvent (e.g. DMC, 3 mL) was degassed with He and placed in a liquid nitrogen bath. The tube was subsequently opened, and an iodine source (e.g. molecular iodine (I$_2$), 33 mg, 0.13 mmol) was added, followed by the condensation of VDF (1.7 g, 25.8 mmol), directly into the tube, which was then redegassed with He. The amount of condensed VDF was determined by weighing the closed tube before and after the addition of the monomer. The tube was then placed in behind a plastic shield, in a thermostated oil bath illuminated with a commercial GE Helical 26 W fluorescent white light Hg spiral bulb, from about 2-4 cm. For polymerization kinetics, identical reactions were set up simultaneously and stopped at different polymerization times. At the end of the reaction, the tube was carefully placed in liquid nitrogen, slowly opened behind the shield, and allowed to thaw to room temperature in the hood, with the concomitant release of unreacted VDF. The contents were poured in water, filtered and dried.

EXAMPLE 9

Enhancing the Leaving Group Ability of Iodine. If C—I bonds can be weakened (analogous to converting an OH group to a tosylate for faster substitution), degenerative transfer may be obtained even with the PVDF-CF$_2$—CH$_2$—I reverse addition chain ends. Such activation may be accomplished either by their conversion to iodonium species. HVI-like PVDF-I(Ph)OTf iodonium species may also photolyze and promote vinylidene fluoride-controlled radical polymerization (VDF-CRP). Both R$_F$—I(Ph)OTf and R$_F$—CH$_2$—I (Ph)OTf initiator models, as well as derivatized PVDF chain ends, may be used in VDF-CRP.

All patents and patent applications, test procedures, and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A process consisting essentially of thermal or photo polymerizing at least one unsaturated monomer in the presence of a hypervalent iodide radical initiator and optionally a solvent, under reaction conditions and for a time sufficient to polymerize the at least one unsaturated monomer to form a polymer.

2. A process consisting essentially of thermal or photo polymerizing at least one unsaturated monomer in the presence of a hypervalent iodide radical initiator comprising $(CF_3COO)_2IPh$ or $(R_FCOO)_2IPh$ and optionally a solvent, under reaction conditions and for a time sufficient to polymerize the at least one unsaturated monomer to form a polymer which contains $CF_3$ or perfluoro ($R_F$) groups as chain ends.

3. The process of claim 1 wherein the at least one unsaturated monomer comprises at least one fluorine substituted alkene monomer, fluorine substituted acrylic acid derivative monomer, fluorine substituted styrene derivative monomer, and/or fluorine substituted vinyl ether monomer.

4. The process of claim 2 wherein a $CF_3$— or perfluoro ($R_F$—) group is incorporated into a molecule using the $(CF_3COO)_2IPh$ or $(R_FCOO)_2IPh$ hypervalent iodide radical initiator.

5. The process of claim 1 wherein the at least one unsaturated monomer comprises vinylidene fluoride (VDF); hexafluoropropene; tetrafluoroethylene; trifluorochloroethylene; $CF_2\!=\!CCl_2$; $CH_2\!=\!CFCl$; $CF_2\!=\!CFX$ where X is Cl or Br; $CH_2\!=\!CX_2$ where X is F, Cl or Br; $CH_2\!=\!CHX$ where X is F, Cl or Br; $CHX\!=\!CY_2$; $CHX\!=\!CYX$, $CX_2\!=\!CY_2$; and/or $CXY\!=\!CY_2$ where X and Y are independently F, Cl, Br, or I.

6. The process of claim 1 wherein the at least one unsaturated monomer is used in a total amount of from about 1 to about 10,000 moles per mole of the hypervalent iodide radical initiator.

7. The process of claim 1 wherein the hypervalent iodide radical initiator comprises [bis(trifluoroacetoxy)iodo]benzene, [bis(trifluoroacetoxy)iodo]pentafluorobenzene, [bis(acetoxy)iodo]benzene, and/or the Dess-Martin periodinane (1,1,1-triacetoxy-1,1-dihydro-1,2-benziodoxol-3(1H)-one) that are derived by ligand exchange including with RCOOH, RNH and ROH, wherein R is a hydrocarbon or fluorohydrocarbon group.

8. The process of claim 1 wherein the hypervalent iodide radical initiator is capable of producing radicals sufficient to initiate polymerization under thermal conditions between about 0° C. and about 100° C., or upon exposure to visible or ultraviolet light.

9. The process of claim 1 wherein the solvent comprises a carbonate or acetonitrile.

10. The process of claim 1 wherein the polymerization is carried out at a temperature between about 0° C. and about 180° C.

11. The process of claim 1 which is a controlled polymerization further carried out in the presence of an iodine source, wherein the iodine source comprises $R_F$—I, $I_2$, $CHI_3$, $CH_2I_2$, $CI_4$, allyl iodide, benzyl iodide, N-iodosuccinimide, $GeI_4$, $PbI_4$, NaI, KI, LiI, $BiI_3$CsI, $CsI_3$, $InI_3$, $Bu_3SnI$, $Me_2SnI_2$, $Bu_4NI$, and/or $Ph_4PI$.

12. The process of claim 1 wherein the polymer has a molecular weight distribution (defined by the ratio of weight average molecular weight to number average molecular weight) from about 1.01 to about 5.

13. A process consisting essentially of polymerizing at least one unsaturated monomer in the presence of a hypervalent iodide radical initiator, a solvent, and an iodine source, under reaction conditions and for a time sufficient to controllably polymerize the at least one unsaturated monomer to form a polymer.

14. The process of claim 13 wherein the iodine source comprises $R_F$—I, $I_2$, $CHI_3$, $CI_4$, $CH_2I_2$, allyl iodide, benzyl iodide, N-iodosuccinimide, $GeI_4$, $PbI_4$, NaI, KI, LiI, $BiI_3$, CsI, $CsI_3$, $InI_3$, $Bu_3SnI$, $Me_2SnI_2$, $Bu_4NI$, and/or $Ph_4PI$.

15. The process of claim 13 wherein the hypervalent iodide radical initiator comprises [bis(trifluoroacetoxy)iodo]benzene, [bis(trifluoroacetoxy)iodo]pentafluorobenzene, [bis(acetoxy)iodo]benzene, and/or the Dess-Martin periodinane (1,1,1-triacetoxy-1,1-dihydro-1,2-benziodoxol-3(1H)-one) that are derived by ligand exchange including with RNH and ROH, wherein R is a hydrocarbon group.

16. A process consisting essentially of:
providing an iodide terminated polymer;
converting the iodide terminated polymer to a hypervalent iodide radical initiator; and
polymerizing at least one unsaturated monomer in the presence of the hypervalent iodide radical initiator, optionally a catalyst, and a solvent, under reaction conditions and for a time sufficient to polymerize the at least one unsaturated monomer to form a block polymer.

17. The process of claim 16 wherein the iodide terminated polymer comprises PVDF-$CF_2$—$CH_2$—I and/or PVDF-$CH_2$—$CF_2$—I, and the hypervalent iodide radical initiator comprises PVDF-$I(OR)_2$ where R is a hydrocarbon group.

* * * * *